United States Patent [19]

Ouellette et al.

[11] Patent Number: 5,933,092
[45] Date of Patent: *Aug. 3, 1999

[54] METHOD AND APPARATUS FOR PERFORMING THE REGISTER FUNCTIONS FOR A PLURALITY OF METERING DEVICES AT A COMMON NODE

[75] Inventors: Maurice Joseph Ouellette, North Berwick, Me.; Samuel G. Hardy, New Durham, N.H.

[73] Assignee: General Electric Company, Schenectady, N.Y.

[ * ] Notice: This patent is subject to a terminal disclaimer.

[21] Appl. No.: 08/824,575

[22] Filed: Mar. 26, 1997

Related U.S. Application Data

[63] Continuation of application No. 08/709,643, Sep. 9, 1996, Pat. No. 5,696,501, which is a continuation of application No. 08/824,249, Aug. 2, 1994, abandoned.

[51] Int. Cl.$^6$ .................................................. G08B 23/00
[52] U.S. Cl. ............... 340/870.02; 364/483; 340/870.05; 340/870.11
[58] Field of Search ......................... 340/310.01, 870.02, 340/870.05, 870.07, 870.28, 870.11; 364/464.22, 483; 455/3.3

[56] References Cited

U.S. PATENT DOCUMENTS

| | | | |
|---|---|---|---|
| 3,702,460 | 11/1972 | Blose .................................. | 340/310.01 |
| 3,967,264 | 6/1976 | Whyte et al. ....................... | 340/310.01 |
| 4,161,720 | 7/1979 | Bogacki .............................. | 340/870.01 |
| 4,190,800 | 2/1980 | Kelly, Jr. et al. .................. | 340/870.02 |
| 4,213,119 | 7/1980 | Ward et al. . | |
| 4,302,750 | 11/1981 | Wadhwani et al. ................ | 340/870.02 |
| 4,348,730 | 9/1982 | Emerson et al. ................... | 340/870.02 |
| 4,415,853 | 11/1983 | Fisher ................................. | 340/870.02 |
| 4,442,492 | 4/1984 | Karlsson et al. ................... | 340/870.02 |
| 4,511,979 | 4/1985 | Amirante ........................... | 364/464.04 |
| 4,652,855 | 3/1987 | Weikel ............................... | 340/870.02 |
| 4,697,180 | 9/1987 | Swanson ............................ | 340/870.02 |
| 4,749,992 | 6/1988 | Fitzemeyer et al. ............... | 340/310.01 |
| 4,783,748 | 11/1988 | Swarztrauber et al. ............ | 364/483 |
| 4,803,632 | 2/1989 | Frew et al. ......................... | 364/464.04 |
| 4,833,618 | 5/1989 | Verma et al. ...................... | 364/483 |
| 4,856,054 | 8/1989 | Smith ................................. | 340/870.02 |
| 4,881,072 | 11/1989 | Carnel ................................ | 340/870.02 |
| 4,940,976 | 7/1990 | Gastouniotis et al. ............. | 340/870.31 |
| 5,053,766 | 10/1991 | Ruiz-del-Portal et al. ........ | 340/870.03 |
| 5,079,715 | 1/1992 | Venkataraman et al. .......... | 340/870.02 |
| 5,204,896 | 4/1993 | Oliver ................................ | 340/870.02 |
| 5,239,575 | 8/1993 | White et al. ....................... | 340/810.02 |
| 5,243,338 | 9/1993 | Brennan, Jr. et al. ............. | 340/870.02 |
| 5,252,967 | 10/1993 | Brennan et al. ................... | 340/870.02 |
| 5,311,581 | 5/1994 | Merriam et al. ................... | 340/870.02 |
| 5,553,094 | 9/1996 | Johnson et al. .................... | 340/870.03 |

*Primary Examiner*—Brian Zimmerman
*Assistant Examiner*—Timothy Edwards, Jr.
*Attorney, Agent, or Firm*—Carl B. Horton

[57] ABSTRACT

A method and apparatus of the present invention includes a common node of a power line communications system for individually performing the register functions for a plurality of electrical metering devices operably connected to the node. The power line communications system includes at least one node having a plurality of registers, a respective one of which is associated with a respective electrical metering device. The electrical metering devices connected via the power lines to the node measure the power consumption of the electrical load associated therewith and transmit a signal indicative of the measured power consumption to the node and, in particular, to the respective register of the node associated with the electrical metering device. The node individually determines the power consumed by each electrical load operably connected to the node based upon the received signals. The results of such calculations are stored in the register associated with each respective electrical metering device. The stored results are also periodically transmitted to the system control center of the power line communications system. Thus, the register functions for a plurality of relatively simple electrical metering devices may be centralized at a common node.

25 Claims, 3 Drawing Sheets

METHOD AND APPARATUS FOR PERFORMING THE REGISTER FUNCTIONS FOR A PLURALITY OF METERING DEVICES AT A COMMON NODE

This is a continuation of application Ser. No. 08/709,643 filed on Sep. 9, 1996 now U.S. Pat. No. 5,696,501, which is a continuation of application Ser. No. 08/284,249 filed on Aug. 2, 1994 now abandon.

FIELD OF THE INVENTION

The present invention relates to power distribution systems and, more particularly, to power line communications systems.

BACKGROUND OF THE INVENTION

Modern electrical power distribution systems supply power to a large number of electrical loads, such as residences, factories or businesses. The power consumed by each electrical load is separately measured by an electrical metering device, such as an induction or electronic type watthour meter. Many electrical power distribution systems include tens of thousands, hundreds of thousands or more metering devices.

Induction type watthour meters have historically been utilized to measure electrical energy consumption. Recently, however, an increasing number of electrical metering devices, such as electronic type watthour meters, have been employed to measure electrical energy consumption. The use of electronic type watthour meters has increased, in part, since electronic meters can measure several quantities in addition to tabulating the kilowatt hours of power consumed by the corresponding load. In addition, electronic type watthour meters may be reprogrammed to alter their operation once they have been installed so as to offer additional metering flexibility.

In order to "read" the electrical metering device to determine the power consumption of the associated load or to reprogram the electrical metering device, various methods of communicating with electrical metering devices have been employed. According to one method of communicating with electronic type watthour meters, a display associated with the meter is observed. Alternatively, the signals may be optically transmitted to and received from an electronic type watthour meter having an optical port using a corresponding optical probe. Both communications methods, however, require the meter to be physically visited in the field.

Since modern electrical power distribution systems include tens of thousands, hundreds of thousands or more metering devices, a power line communications method has been employed to transfer signals to and receive signals from electronic type watthour meters without having to physically visit the meter in the field. Many different types of signals may be transmitted including signals indicative of the quantities measured by the metering device, such as kilowatt hours of power consumed, so as to permit the meter to be "read" from a remote location. The signals may also include revised instructions to reprogram the electronic meter.

One power line communications system is the UCNet™ system marketed by General Electric Company, assignee of the present invention. The UCNet™ system is described and illustrated in a publication entitled "GE UCNet System" by GE Meter and Control of Somersworth, N.H., which bears document number GEA12091 9/91 7M. The UCNet™ system is also described in a publication entitled "Engineering Presentation to AEIC/EEI Meter and Service Committees" by GE Meter and Control which bears document number GET-6638.22 9/91 (3M). The disclosures of both publications are incorporated herein by reference.

A typical power line communications system, such as that illustrated in U.S. Pat. No. 4,749,992 to Fitzemeyer which is incorporated herein by reference, includes a central control station, typically referred to as a system control center, which transmits signals to one or more radio towers. The signals may be transmitted to the radio tower by RF transmission or by cable television or telephone lines or by a satellite or microwave link. Each radio tower, in turn, rebroadcasts the signals to a plurality of nodes, such as by RF transmission.

Each node is typically a remote local relay module associated with a distribution transformer. Each relay module then transmits the signals to the individual, electrical metering devices via the power lines which connect the associated distribution transformer to the metering devices. Thus, the power lines, in addition to transferring electrical power to the metering device and the electrical load, also act as a communications bus for communications between the node and the metering devices. Accordingly, a local area network is established between a node and the electrical metering devices operably connected to the secondary side of the distribution transformer associated with the node.

A power line communications system, such as the UCNet™ system, not only includes the power lines extending from the distribution transformer to the electrical loads, i.e. residences or businesses, but also the electrical wiring within the residences or businesses. The UCNet™ and other systems transmit signals via the power lines according to a predetermined format or protocol such as the consumer electronics bus ("CEBus") protocol. The CEBus protocol for power line signals is described in an interim standard published by the Electronic Industries Association of Washington, D.C. which is entitled "EIA Home Automation System (CEBus)", the contents of which are incorporated herein by reference.

Electronic type watthour meters coupled to the electrical loads of the distribution transformer include a modem for receiving and translating the signals transmitted via the power lines. The modem thereafter provides the translated signal to the controller or processor of the electronic type watthour meter. The modem is bidirectional so as to also transmit signals from the electronic type watthour meter on the power lines.

The node and each electronic type watthour meter within a local area network is assigned a predetermined address. As explained in more detail in the publication entitled "EIA IS-60 CEBus Volume 4 Node Protocol Draft Standard", the standard CEBus protocol includes seven hierarchical layers. The data link layer includes fields for the actual command or signal to be transmitted, designated the information field, as well as fields for the source address and the destination address of the signal. Accordingly, the device which sent and the device which is to receive the signal are identified by their respective predefined addresses.

Recently, an increasing number of electronic type watthour meters have been employed to measure electrical energy consumption since they can compute several quantities in addition to measuring the kilowatt hours of power consumed by the corresponding load. For example, electronic type watthour meters can compute the power factor, kilovolt amperes ("KVA"), and reactive volt amperes of power consumed by the corresponding load. The computation of the various measures of power consumption, such as power factor, KVA and reactive volt amperes of power consumed by each load of the power distribution system, is desirable since these measurements provide additional information regarding the customers' electrical energy usage. This information can be used by the power distribution company to more accurately anticipate the customers' future power demands and to plan accordingly.

The total electrical power demand upon most power distribution systems is cyclical throughout each day with one or more peaks in the demand for electrical energy. The cyclical electrical energy demand is relatively consistent such that the peaks in electrical energy demand occur at substantially the same time each day. Likewise, the off-peak time periods also occur at relatively the same times of each day. Thus, many suppliers of electrical power charge more for electrical energy consumption during the peak periods than during the off-peak periods to reflect the increased cost of supplying the power during the peak periods.

Electronic type watthour meters may also include an electronic register which can provide time of use metering as well as other functions. Time of use metering separately tabulates the electrical consumption of the load during distinct, predetermined periods of time. Electronic time of use watthour meters having electronic registers, therefore, may measure the electrical energy consumption separately during the predetermined off-peak and peak periods of time. Separate billing rates may thereafter be applied to the electrical consumption during those periods of time by the suppliers of the electrical power.

The increased metering flexibility and capacity provided by electronic type watthour meters is due, at least in part, to the electronic acquisition, integration and processing of the measured electrical consumption of the load. Within each electronic type watthour meter, the electronic processing is principally provided by the register. The register typically includes an electronic processor or controller as well as memory for data storage.

Electronic type watthour meters which measure several quantities, in addition to the kilowatt hours of power consumed by the associated load, typically require a fairly sophisticated register. For example, such a register may require a more advanced electronic processor or controller as well as additional memory for storing the computed quantities. In addition, the processor or controller of a sophisticated register may need to perform more rapid numerical processing in order to perform the necessary computations. The need for a sophisticated register is particularly apparent in electronic type watthour meters which provide time of use metering. In these registers, the necessary electronic processor or controller must perform all the necessary computations while, simultaneously, separating the power consumption among the distinct, predetermined periods of time.

Electronic type watthour meters which compute several measures of power consumption also generally include a comparatively sophisticated display adapted to display each of the computed measures of power consumption. The meter may thus be "read" upon physically visiting the meter.

Presently, each electronic type watthour meter of the electrical power distribution system includes a register. A significant and increasing number of these electronic type watthour meters incorporate relatively sophisticated registers to measure and calculate several quantities in addition to kilowatt hours of power consumed and to provide time of use metering. Thus, tens of thousands, hundreds of thousands or more of electronic metering devices incorporating sophisticated registers may be "in the field" as part of a modern electrical power distribution system.

Each electronic type watthour meter incorporating a sophisticated register is significantly more expensive than an electronic type watthour meter which includes a relatively simple register, such as an interval recording meter. However, it is desirable to continue to compute the additional measures of power consumption and to perform time of use metering which electronic type watthour meters having relatively sophisticated registers presently provide.

SUMMARY OF THE INVENTION

It is therefore an object of the invention to provide an improved electrical metering device.

It is another object of the invention to provide an improved method and apparatus for computing the electrical power consumption of a load in a power distribution system with an electrical metering device having a relatively simple and comparatively inexpensive register.

These and other objects are provided, according to the invention, by an electrical metering device including metering means for measuring the power consumption of an associated electrical load and means for transmitting a signal indicative of the measured power consumption via the power lines to a node for tabulating the individual power consumption of each electrical load operably connected to the node. Thus, the electrical metering device may include a relatively simple register, if any, and a relatively simple display, if any. The node, instead, includes the register means for individually computing the various measures of electrical power consumption and for performing time of use metering for each of the plurality of electrical loads connected to the common node.

The signals which the electrical metering device transmits to the node may be pulses, one of which is produced upon the consumption by the associated load of a predetermined amount of energy. In other embodiments, the electrical metering device may include memory means for maintaining a cumulative count of the number of pulses, which count is periodically transmitted to the node. In still other embodiments, the electrical metering device may include a memory device for storing a measure, such as kilowatt hours, of the power consumed by the associated load. The measure of power consumption is then periodically transmitted to the node.

While the count of pulses or the measure of power consumption may be reset prior to each period of time, a cumulative total is preferably maintained in the memory means. Accordingly, if the node does not properly receive one of the periodic signals from the transmitting means, the node will obtain a measure of the power consumption during the period from which no corresponding signal was received from a subsequent signal which is indicative of the total pulses received or the cumulative power consumed.

The electrical metering device also preferably includes clocking means, operably connected to the transmitting means, for periodically producing a timing signal. The transmitting means, in response to the timing signal, then sends the signal, indicative of the measured power consumption, to the common node.

For electrical metering devices incorporating time of use metering, the clocking means not only produces a periodic timing signal, but also preferably produces a signal which includes the length of time remaining in a predetermined period of time. The transmitting means of such electrical metering devices not only sends the signal, in response to the timing signal, indicative of the cumulative power consumption of the associated electrical load, but also sends a signal indicative of the length of time remaining in the predetermined period of time. Thus, the electrical metering device and the common node may be synchronized within the predetermined period of time in which the electrical energy consumption was measured.

The transmitting means, preferably including a modem and electronic controller or processor, preferably sends signals according to a consumer electronics bus protocol via the power lines interconnecting the electrical metering device with a distribution transformer as well as a node associated with the distribution transformer. Accordingly, the transmitting means preferably includes means for formatting the signals according to the consumer electronics bus protocol.

The electrical metering device also preferably includes display means, such as a liquid crystal display or a set of mechanical dials, for displaying the measured power consumption of the associated load. The display means, however, need not be capable of displaying time of use measurements or other measurements of the electrical power consumption computed from the measured power consumption. Instead, the display means need only display the measured power consumption with the other computations being performed at the common node.

The node of the present invention allows the plurality of electrical metering devices to communicate with a system control center via the power lines interconnecting the distribution transformer and the plurality of electrical metering devices. The node includes means, such as a modem and an electronic controller or processor, for communicating with a plurality of electrical metering devices via the power lines.

Thus, the node receives the signals from the electrical metering devices operably connected to the node and, based on those signals, determines the kilowatt hours of power consumed as well as any additional measures of power consumption desired. The node may also determine the power consumption within each of a number of predefined periods of time if time of use metering is desired. Furthermore, the node separately performs these register functions for each electrical metering device connected to the node prior to transmitting the computed results to a system control center of the power communications system.

In order to individually perform the necessary computations for each electrical metering device connected thereto, the node includes register means having a plurality of registers, a respective one of which is associated with a respective metering device connected to the node. The register means is adapted to receive signals from electrical metering devices which are indicative of the power consumed by the electrical load coupled to the electrical metering devices. Based on the received signals, the register means is adapted to determine the power consumption of each individual electrical load, including time of use calculations, if desired, as well as the power factor, KVA and reactive volt amperes of the power consumed. Each of the plurality of registers also preferably includes memory means for storing the signals received from the respective electrical metering devices as well as the results of the computations performed on the received signals.

A node of the present invention also preferably includes means for prompting the electrical metering devices connected to the node. The node prompts the associated electrical metering devices to transmit signals indicative of the power consumption of the associated electrical loads. Thus, electrical metering devices may be configured to transmit signals indicative of power consumption continuously, periodically or upon prompting by the node.

The signals received from the electrical metering devices are preferably formatted according a consumer electronics bus protocol. Accordingly, the node preferably comprises means, such as the modem and the electronic controller or processor, for receiving signals formatted according to the consumer electronics bus protocol. In addition, the node preferably includes means for transmitting the signals received from the electrical metering devices and the results of the calculated power consumption of the electrical loads to the system control center.

Therefore, a power line communications system of the present invention allows the power consumption of an electrical load to be measured by an electrical metering device which need not include sophisticated register means for performing computations with the measured power consumption. Instead, a common node, associated with the plurality of electrical metering devices, includes register means having a plurality of registers, a respective one of which is associated with a respective electrical metering device, for receiving signals indicative of the measured power consumption from the electrical metering devices and for performing the necessary computations therewith. Accordingly, relatively simple, and therefore less expensive, electrical metering devices may be employed by the electrical power distribution company.

DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
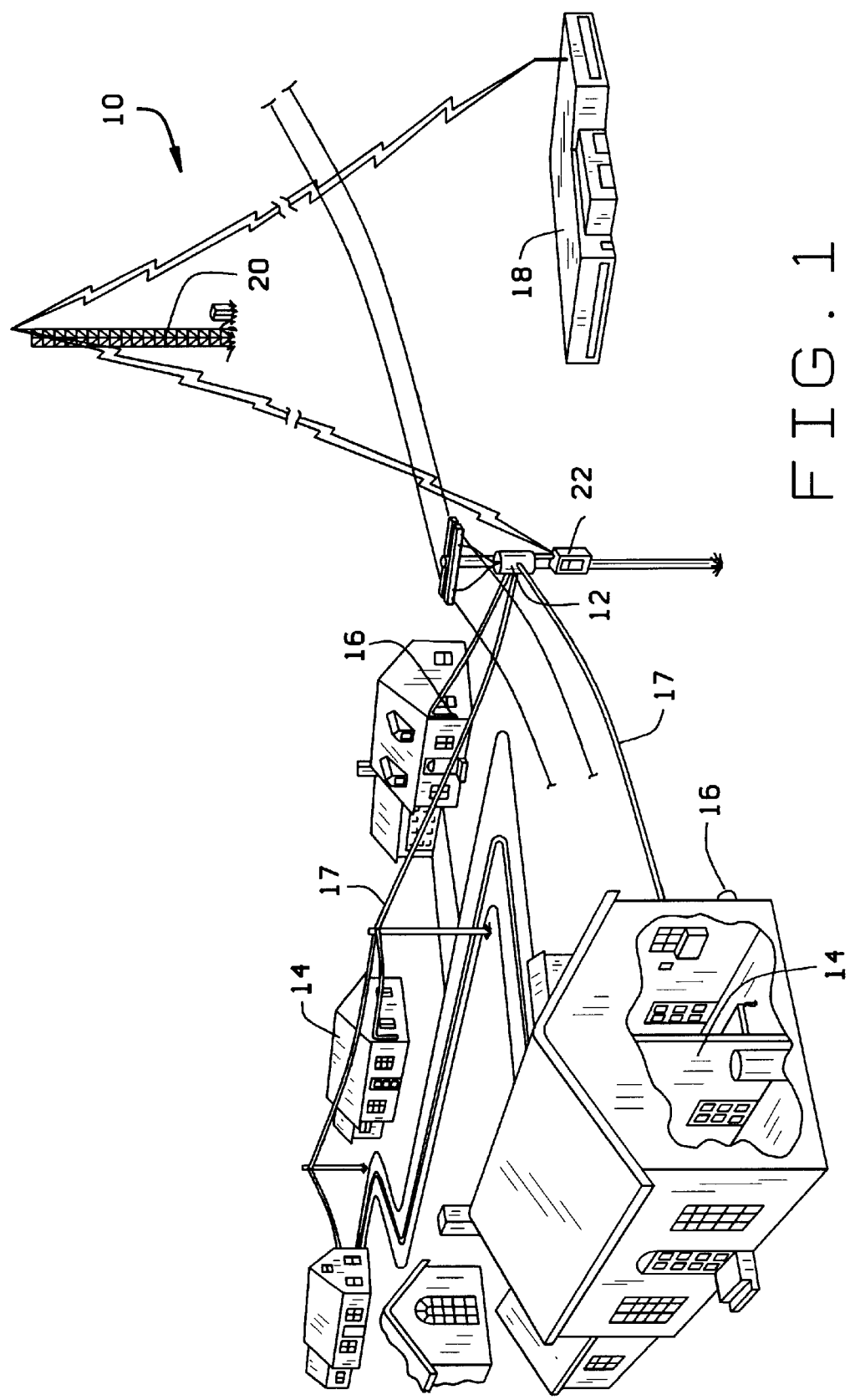
FIG. 1 is a perspective view of a power line communications system for transmitting signals to and from a plurality of electrical metering devices.

Referring now to FIG. 1, a portion of an electrical power distribution and communications system 10, such as the UCNet™ system, is illustrated. The electrical power distribution system 10 includes a plurality of distribution transformers 12. The secondary side of the distribution transformers 12 is generally connected to a plurality of electrical loads 14. The electrical loads 14 are typically residential homes, businesses or factories which consume electrical power. An electrical metering device 16, such an electronic type watthour meter, is coupled to each of the plurality of electrical loads 14 for measuring the electrical consumption of the corresponding load 14.

FIG. 1 also illustrates one embodiment of a power line communications system in which commands may be transmitted via the electrical power lines 17 to the plurality of electrical metering devices 16 of the present invention. Accordingly, the power lines 17 not only conduct current from distribution transformers 12 to the electrical loads 14, but also serve as a communications bus.

The power line communications system includes a central control station 18, typically referred to as a system control center, which transmits commands to a plurality of radio towers 20. The commands are preferably transmitted from the system control center 18 to the radio towers 20 via RF signals. However, the signals may be transmitted via cable television or telephone lines or by satellite or a microwave link. The radio tower 20 thereafter broadcasts the signals, preferably RF signals, to a plurality of nodes 22. More preferably, the power line communications system includes a self-contained RF system which provides for RF transmission between the system control center 18, the radio tower 20 and the plurality of nodes 22.

Each node 22 preferably includes a remote local relay module associated with a distribution transformer 12. The node 22 receives the signal and, in turn, transmits the signal via power line 17 to each electrical metering device 16 coupled to an electrical load 14 of the associated distribution transformer 12. While the present invention is illustrated and hereinafter discussed in conjunction with a power line communications system in which signals are transmitted between a node 22 and the plurality of associated electrical metering devices 16 via the power lines 17, signals can also be transmitted between a node and the plurality of associated electrical metering devices via radio frequency signals without departing from the spirit and scope of the present invention.

Figure 2:
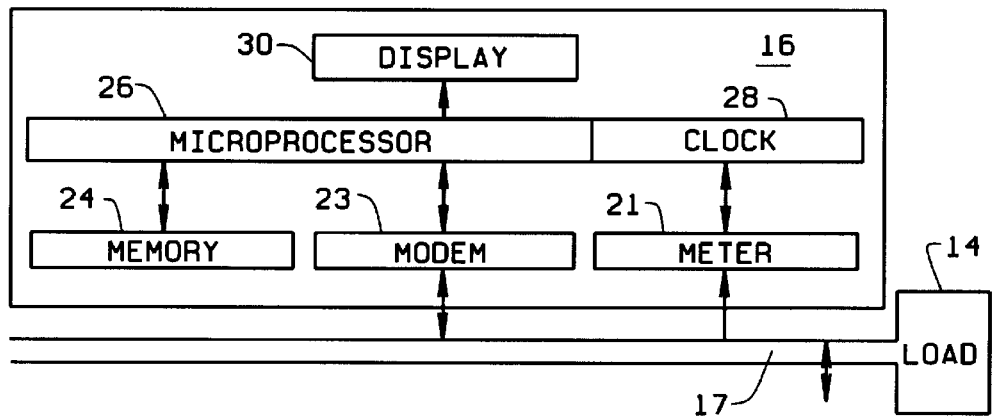
FIG. 2 is a block diagram of an electrical metering device according to the present invention.

Referring now to FIG. 2, a block diagram of an electrical metering device 16 according to the present invention is illustrated. Each electrical metering device 16 preferably includes metering means 21 for measuring the electrical power consumption of the load 14 to which the metering device 16 is coupled. The metering means 21 typically produces a pulse for each quantum of energy consumed by the corresponding load 14. Alternatively, the metering means 21 may produce a signal having a frequency or pulse repetition rate related to the energy consumed by the corresponding load 14.

The electrical metering device 16 also includes means, such as modem 23, for transmitting a signal indicative of the measured power consumption via the associated power line 17 to the associated node 22. For example, the electrical metering device may include a disk which rotates in response to power consumption by the load 17. As an indication of the power consumption of the load 17, a pulse may be produced for each revolution of the disk. This pulse may, in turn, be transmitted via the power line 17.

The electrical metering device 16 includes means for controlling the transmission of signals to the node 22. The control means 26 is preferably an electronic controller or processor, such as the microprocessor illustrated in FIG. 2. In addition, the memory means 24 need not be a discrete memory device which is distinct from the microprocessor 26 as illustrated in FIG. 2. Instead, the electrical metering device 16 may utilize the internal memory of the microprocessor 26 as the memory means. Alternatively, the memory means 24 may be an external, circular, non-volatile memory device which prevents stored power consumption measurements from being lost in the event of a power failure. However, it will be apparent to those skilled in the art that any number of memory devices 24 may be utilized by the electrical metering devices 16 of the present invention.

The electrical metering device 16 also preferably includes clocking means 28, operably connected to the transmitting means, for periodically producing a timing signal. As illustrated in FIG. 2, the microprocessor 26 may include the clocking means 28, or the electrical metering device 16 may include a distinct clocking generator circuit. The transmitting means, in response to the periodic timing signal, sends a signal indicative of the measured power consumption via the power line 17 to the associated node 22.

In one embodiment of the electrical metering device 16, the control means 26 tabulates and the memory means 24 stores a cumulative count of the number of pulses, one of which is received for each quantum of energy consumed. Accordingly, the periodic signal sent by the transmitting means is the tabulated cumulative count of pulses stored in the memory means 24. The electrical metering device 16 may thereafter reset the pulse count prior to counting the pulses in the next period. Alternatively, the electrical metering device 16 may maintain a running cumulative count of pulses which spans a plurality of time periods. For example, the electrical metering device 16 may transmit the following sequence of signals indicative of the cumulative pulse count: 1000, 1210, 1400, 1511, 1687 . . . . Thus, if there is an error in transmission of the signal or for some other reason, the signal is not properly received by the node 22, the subsequent signal transmitted by the electrical metering device 16, which is indicative of the cumulative pulse count, will include not only the power consumed during the immediately preceding period, but also the power consumed during the period for which no signal was properly received.

In another embodiment, the control means 26 tabulates and the memory means 24 stores a measure, such as kilowatt hours, of the power consumption of the associated load 14. This measure of power consumption may then be periodically transmitted to the node 22. While the measure of power consumption may be reset for each period of time, a cumulative, running total is preferably maintained in the memory means 24. Even though the electrical metering device 16 may compute a measure of power consumption, an electrical metering device 16 according to the present invention need not include sophisticated register means for performing computations with the measured power consumption.

The electrical metering device 16 of the present invention may also be utilized to measure the electrical power consumption for time of use metering. For example, predetermined periods of time in which the electrical power consumption is desired to be individually tabulated may be selected by the power distribution company and stored within the memory means 24. In this embodiment, the clocking means 28, in addition to producing the periodic timing signal, may also produce a signal indicative of the length of time remaining in a predetermined period of time.

For electrical metering devices configured to perform time of use metering, the transmitting means, in response to the periodic timing signal, will typically send a signal indicative of the power consumption of the associated electrical load 14 via the power line 17 to the node 22. During the predetermined periods of time, the transmitting means also sends a signal indicative of the length of time remaining in the predetermined period of time which is provided by the clocking means 28. Accordingly, the electrical metering device 16 and the node 22 may be synchronized such that the signals indicative of the power consumption of the associated electrical load 14 may be applied to the appropriate predetermined periods of time.

The electrical metering device 16 also preferably includes means for displaying the measured power consumption of the associated load 14. However, the display means 30, typically a set of mechanical dials or a liquid crystal display, may be a relatively simple display that may display the kilowatt hours of power consumption by the electrical load 14, but need not display time of use metering information or additional measures of power consumption since those computations will be performed at the node 22.

Figure 3:
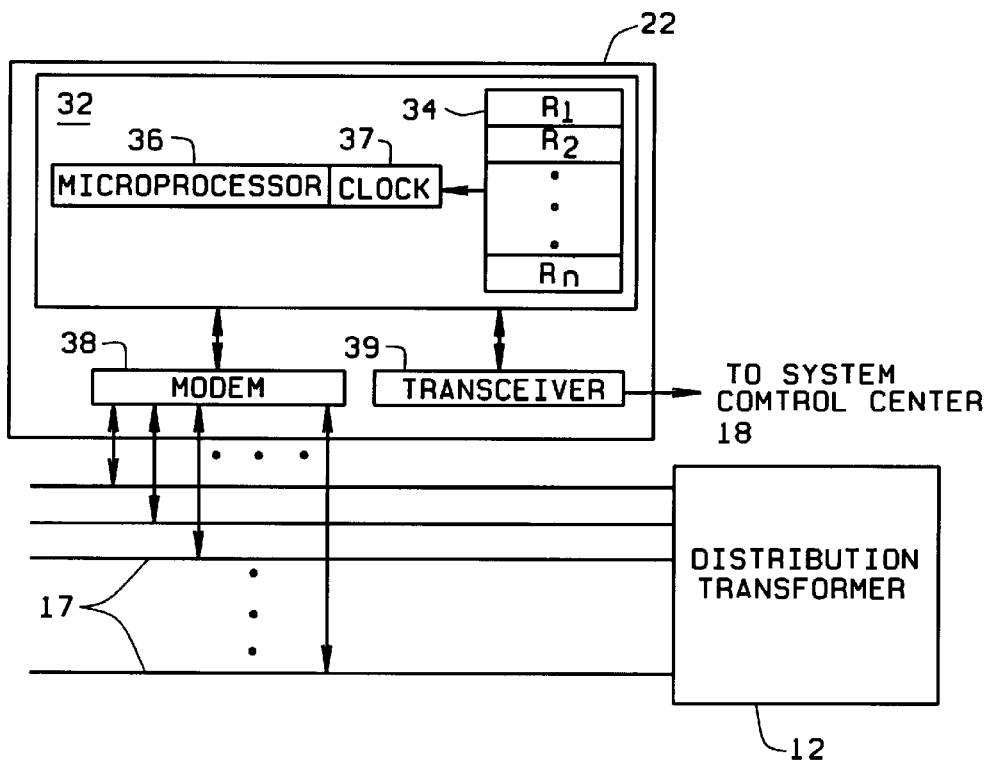
FIG. 3 is a block diagram of a node according to the present invention.

The power line communications system of the present invention also includes at least one node 22 as illustrated in block diagram form in FIG. 3. This node 22 includes means, preferably a modem 38, for communicating with the plurality of electrical metering devices 16 operably connected to the node 22 via the power lines 17. The node 22 also includes means, preferably a transceiver 39, for communicating bidirectionally with the system control center 18. The communications between the node 22 and the system control center 18 is generally via radio frequency signals.

The node 22 also preferably includes register means 32 including a plurality of registers 34, a respective one of which is associated with a respective electrical metering device 16 connected to the node 22 by the power line 17. For example, register $R_1$ of FIG. 3 may be associated with a first electrical metering device, register $R_2$ may be associated to a second electrical meter device, and so on. In operation, the register means 32 receives signals from the associated electrical metering devices 16. The signals are indicative of the power consumption of the electrical loads 17 coupled to the associated electrical metering devices 16.

In addition to the plurality of registers 34, the register means 32 typically includes control means, such as the microprocessor 36 illustrated in FIG. 3. The microprocessor receives and transmits signals, via the modem 38, to the power lines 17 and the system control center 18. In addition, the microprocessor 36 is adapted to perform computations based upon the signals transmitted by the electrical metering devices 16. For example, if the signals transmitted are pulses indicative of the electrical power consumption, the microprocessor 36 will individually determine the kilowatt hours of power consumption of the load 14 associated with each respective electrical metering device 16. Such computations will also typically include other measures of power consumption such as power factor, KVA and reactive volt amperes of power consumed by the loads 14 associated with each respective electrical metering device 16.

In addition, the register means 32 of the node 22 also preferably includes clocking means 37. As illustrated in FIG. 3, the microprocessor 36 may incorporate the clocking means 37 or an external clock generator circuit may be utilized. The register means 32 of node 22 may then perform time of use metering functions for predetermined periods of time. Accordingly, the power consumption by each respective electrical load 14 may be individually computed for each predetermined period of time by the register means 32 of node 22 illustrated in FIG. 3.

Each register 34 typically includes memory means. The memory means may either be a memory device external to the microprocessor 36 of the register means 32 or the internal memory of the microprocessor 36. In either instance, the memory means of each register 34 must be sufficiently large to store the measured power consumption as well as each computations performed thereon by the microprocessor 36 of the register means 32. Thus, as an example, a first memory location within register $R_1$ may store the measured power consumption of the load 14 associated with the first electrical metering device 16, a second memory location may store the power factor for the measured power consumption, a third memory location may store the KVA consumed by the load 14, and a fourth memory location may store the reactive volt amperes of power consumed by the load 14. In addition, the memory means of registers 34 which are associated with electrical metering devices 16 which perform time of use metering must include memory locations to store the electrical power consumption and related computations for each predetermined period of time.

Although the electrical metering devices 16 may be configured to transmit signals continuously or periodically in response to a timing signal, the node 22 may also include means for prompting the electrical metering devices 16 connected to the node 22 to transmit signals indicative of the power consumption of their respective electrical loads 14. Thus, the electrical metering devices 16 may maintain a cumulative measure of the power consumption and transmit a signal upon prompting by the node 22. The prompting means is preferably the microprocessor 36 and associated clocking means 37 for periodically transmitting a signal via the power lines 17 to the electrical metering devices 16 operably connected thereto. However, other well known prompting techniques may be used.

The signals transmitted via the power line 17 between the electrical metering devices 16 and the node 22 are preferably formatted according to a consumer electronics bus protocol. Accordingly, the transmitting means of each electrical metering device 16 includes means, typically the modem 23 and the associated microprocessor 26, for formatting the signals according to the consumer electronics bus protocol. Likewise, the node 22 also includes means, typically the modem 38 and the associated microprocessor 36, for receiving signals formatted according to the consumer electronics bus protocol.

The node 22 also communicates with the system control center 18, such as via radio frequency signals. The node 22 will typically transmit signals periodically that are indicative of the data stored in each register 34 of the register means 32. Accordingly, the electrical energy consumption of each electrical metering device 16 associated with the node 22 as well as the additional measures of power consumption computed by the node 22 and the time of use metering information will be transmitted. The node 22 may also include means for displaying the measure of electrical power consumption for each electrical metering device 16.

The information regarding each electrical metering device 16 connected to the node 22 is distinguishable based, not only on the register 34 in which the information is stored, but also on a predetermined, distinct address assigned to each node 22 and electrical metering device 16. Thus, by transmitting the respective address of the electrical metering device 16 with the information, the measured power consumption and related data may be associated with the particular electrical metering device 16 corresponding to the predetermined address.

Figure 4:
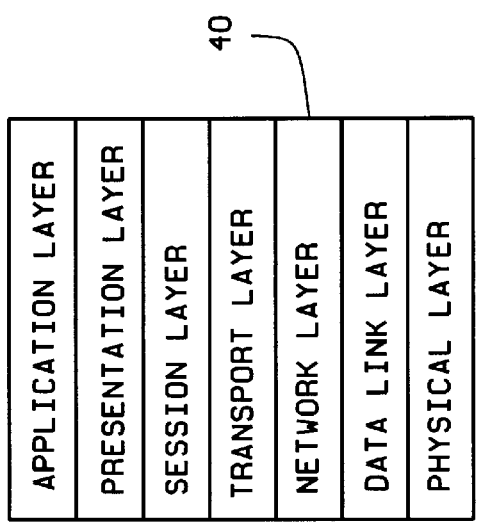
FIG. 4 is a block diagram of a standard CEBus protocol.
Figure 5:
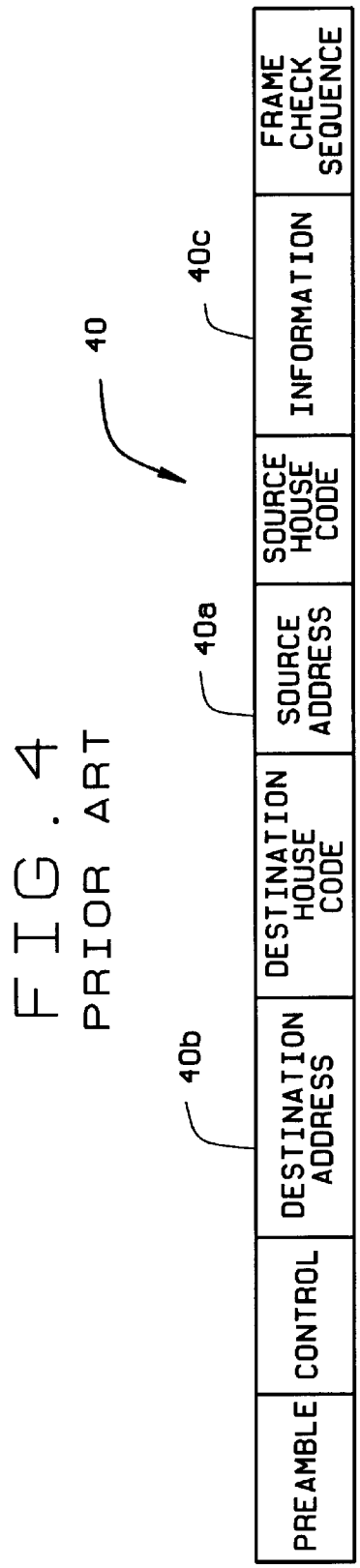
FIG. 5 is a block diagram of the data link layer of the standard CEBus protocol of FIG. 4.

For example, a consumer electronics bus signal, illustrated in FIG. 4, includes seven standard layers. One of these layers is the data link layer 40 illustrated in more detail in FIG. 5. The data link layer 40 includes addresses designating both the source 40a and the destination 40b of the information 40c. Accordingly, the appropriate electrical metering device 16 will be associated with the power consumption information. The design and utilization of the consumer electronics bus and the data link layer is well known to those having skill in the art, and need not be described further herein.

According to the present invention, the plurality of electrical metering devices 16 may individually measure the power consumption of the associated electrical loads 14. The electrical metering devices 16 may then transmit signals indicative of the measured power consumption via the power lines 17 to a common node 22. Based on these signals, the common node 22 may individually compute and store various measures of power consumption, including time of use metering information for each of the plurality of electrical metering devices 22 and electrical loads 14 connected thereto.

Thus, relatively simple electrical metering devices may be employed which do not include sophisticated registers or display means. Instead, the common node 22 may include a central register means 32 to perform the register functions for each of the plurality of electrical metering devices 16 connected thereto prior to transmitting signals indicative of the power consumption for each electrical metering device 16 to the system control center 18.

In addition to providing a power line communications system 10 which can employ a plurality of relatively simple electrical metering devices 16, the node 22 of the present invention can sum the electrical power consumption of each electrical load operably connected thereto. This sum represents the total power demand on the distribution transformer 12 associated with the node 22. This sum may also be transmitted to the system control center 18 such that the power distribution company can utilize the total power demand information, as part of a transformer load management program, to determine if the distribution transformer 12 is efficiently loaded.

The sum computed from the signals indicative of the power consumption by each load may also be used to detect a metering problem, such as meter tampering. In order to determine if there is a metering problem, the computed sum may be compared with a measure of total power supplied to the electrical load 14 operably connected to the node 22. The measure of total power supplied is determined by the associated distribution transformer 12. Thus, if the total power consumption determined from the signals received from the electrical metering devices 16 differs substantially from the total power supplied by the distribution transformer 12, a metering problem, such as tampering, may exist.

Still further, the electrical metering devices 16 may also transmit signals which indicate that the power service to the load 14 was interrupted at some point in the preceding period. By comparing these power outage signals with the power interruptions detected by the node 22, power delivery problems involving a particular metering device 16 may be detected.

A power line communications system 10 of the present invention need not only include nodes 22 such as that illustrated in FIG. 3, but may also include conventional nodes 22 which merely pass signals received from the plurality of electrical metering devices 16 associated therewith to the system control center 18. Typically, these conventional nodes 22 pass the received signals to the system control center 18 after only changing the format of the signals such that the signals which were received via the power line 17 may be transmitted via radio frequency signals. Accordingly, the electrical metering devices 16 connected to such conventional nodes 22 must each include relatively sophisticated register means for performing the computations of the various measures of power consumption as well as time of use metering information, if desired, prior to transmitting the results of these computations.

In the drawings and the specification, there has been set forth a preferred embodiment of the invention and, although specific terms are employed, the terms are used in a generic and descriptive sense only and not for purpose of limitation, the scope of the invention being set forth in the following claims.

What is claimed is:

1. Apparatus for receiving metering data from at least one electricity meter coupled to an electrical load and for communicating data to a remotely located receiver, said apparatus configured to be located remote from the electricity meter and comprising:

a receiver for receiving the metering data;

a register for performing at least one power consumption computation using the received metering data; and a transmitter for transmitting at least the power consumption computation result to the remotely located receiver.

2. Apparatus in accordance with claim 1 wherein said register comprises a memory for storing a result of the power consumption computation, and said memory comprises a plurality of register storage locations and said register is configured to perform a plurality of power consumption computations using the received metering data, and power consumption computation results are stored in respective register storage locations.

3. Apparatus in accordance with claim 1 wherein said apparatus is configured to receive metering data from a plurality of electricity meters coupled to respective electrical loads, and wherein said register comprises a memory for storing a result of the power consumption computation, and said memory comprises a plurality of register storage locations, said register configured to perform a plurality of power consumption computations using the received metering data from each respective electricity meter, and power consumption computation results for metering data from respective electricity meters are stored in respective register storage locations.

4. Apparatus in accordance with claim 1 wherein the remotely located receiver is located at a system control center.

5. Apparatus in accordance with claim 1 wherein said at least one power consumption calculation comprises at least one of a kilowatt hour computation, a time of use computation, a demand computation, a power factor computation, an apparent power computation, and a reactive volt amperes computation.

6. Apparatus in accordance with claim 1 wherein said apparatus receiver is a power line receiver.

7. Apparatus in accordance with claim 1 wherein said apparatus receiver is a radio receiver.

8. A system, comprising:

at least one electricity meter coupled to an electrical load, said meter comprising a transmitter for transmitting metering data;

a system control center comprising a receiver for receiving signals; and at least one intermediate unit comprising:

a receiver for receiving metering data;

a register for performing at least one power consumption computation using the received metering data; and a transmitter for transmitting at least the power consumption computation result.

9. A system in accordance with claim 8 wherein said intermediate unit comprises a memory for storing a result of the power consumption computation, and said intermediate unit memory comprises a plurality of register storage locations and said intermediate unit register is configured to perform a plurality of power consumption computations using the received metering data and to store power consumption computation results in respective register storage locations.

10. A system in accordance with claim 8 further comprising a plurality of meters coupled to respective electrical loads, and wherein said intermediate unit comprises a memory for storing a result of the power consumption computation, and said intermediate unit memory comprises a plurality of register storage locations, said intermediate unit register configured to perform a plurality of power consumption computations using received metering data, and power consumption computation results for metering data from respective electricity meters are stored in respective register storage locations.

11. A system in accordance with claim 8 wherein said meter continuously transmits metering data.

12. A system in accordance with claim 8 wherein said meter periodically transmits metering data.

13. A system in accordance with claim 8 wherein said at least one power consumption calculation comprises at least one of a kilowatt hour computation, a time of use computation, a demand computation, a power factor computation, an apparent power computation, and a reactive volt amperes computation.

14. A system in accordance with claim 8 wherein said intermediate unit receiver is a power line receiver.

15. A system in accordance with claim 8 wherein said intermediate unit receiver is a radio receiver.

16. An electricity meter, comprising:
a meter unit configured to be coupled to a power line supplying power to an electrical load and for measuring the power consumption of an electrical load from the power line;
a reduced functionality register, coupled to said meter unit, for performing at least one power consumption computation using the power consumption measured by said meter unit; and
a communications unit, coupled to said reduced functionality register, for transmitting a signal representative of a power consumption computation result to an external register located remote from said meter.

17. A meter in accordance with claim 16 wherein the power consumption computation is kilowatt hours.

18. A meter in accordance with claim 16 wherein said communications unit comprises a radio transmitter.

19. A meter in accordance with claim 16 wherein said communications unit comprises a power line transmitter.

20. A meter in accordance with claim 16 wherein said meter is configured to continuously transmit metering data.

21. A meter in accordance with claim 16 wherein said meter is configured to periodically transmit metering data.

22. A method for transmitting energy consumption related data in a system including at least one electricity meter coupled to an electrical load, the meter including a transmitter for transmitting metering data, a system control center, and at least one intermediate unit including a receiver for receiving metering data, a register for performing at least one power consumption computation using the received metering data, and a transmitter for transmitting at least the power consumption computation result, said method comprising the steps of:
transmitting metering data from the meter transmitter;
receiving the metering data at the intermediate unit receiver;
controlling the register to perform at least one power consumption computation using the received metering data; and
transmitting at least the one power consumption computation result to the system control center.

23. A method in accordance with claim 22 wherein transmitting metering data from the meter transmitter comprises the step of continuously transmitting metering data from the meter transmitter.

24. A method in accordance with claim 22 wherein transmitting metering data from the meter transmitter comprises the step of periodically transmitting metering data from the meter transmitter.

25. A method in accordance with claim 22 wherein the at least one power consumption calculation comprises at least one of a kilowatt hour computation, a time of use computation, a demand computation, a power factor computation, an apparent power computation, and a reactive volt amperes computation.

* * * * *